(12) United States Patent
Underkofler et al.

(10) Patent No.: US 8,630,065 B1
(45) Date of Patent: Jan. 14, 2014

(54) DATA STORAGE DEVICE TAPE PATH CLEANER

(75) Inventors: Daniel W. Underkofler, Lafayette, CO (US); Steven Suttle, Broomfiled, CO (US); Scott D. Wilson, Thronton, CO (US)

(73) Assignee: Oracle International Corporation, Redwood City, CA (US)

( * ) Notice: Subject to any disclaimer, the term of this patent is extended or adjusted under 35 U.S.C. 154(b) by 0 days.

(21) Appl. No.: 13/536,224

(22) Filed: Jun. 28, 2012

(51) Int. Cl.
*G11B 5/41* (2006.01)

(52) U.S. Cl.
USPC ........................................................ 360/128

(58) Field of Classification Search
USPC .......... 360/128, 130.21, 130.31, 130.33, 132, 360/134
See application file for complete search history.

(56) References Cited

U.S. PATENT DOCUMENTS

| | | | |
|---|---|---|---|
| 3,931,643 A * | 1/1976 | Kuroe ........................... | 360/128 |
| 5,463,519 A * | 10/1995 | Dodt et al. .................... | 360/128 |
| 6,067,212 A | 5/2000 | Poorman | |
| 6,497,377 B2 | 12/2002 | Underkofler et al. | |
| 6,621,656 B2 | 9/2003 | Underkofler et al. | |
| 7,965,469 B2 * | 6/2011 | Inugai et al. .................. | 360/128 |
| 8,318,242 B2 * | 11/2012 | Bradshaw et al. ............ | 427/127 |
| 2007/0133127 A1 * | 6/2007 | Stamm et al. ................. | 360/128 |

* cited by examiner

*Primary Examiner* — Angel Castro
(74) *Attorney, Agent, or Firm* — Brooks Kushman P.C.

(57) ABSTRACT

A tape cartridge is provided with a reel mounted for rotation in a housing. Tape with a length, a width and a thickness, is wound upon the reel in a length direction of the tape. A leader is mounted to a free end of the tape. The leader has at least one portion with a width greater than the tape width to clean a tape path, such as a guide and/or a lens. Another tape cartridge is provided with a reel mounted for rotation in a housing. Tape is wound upon the reel in a length direction of the tape. A leader is mounted to a free end of the tape. A brush is mounted to a portion of the leader for cleaning a tape path.

18 Claims, 6 Drawing Sheets

DATA STORAGE DEVICE TAPE PATH CLEANER

TECHNICAL FIELD

Various embodiments relate to a tape path cleaner for a data storage device.

BACKGROUND

In data storage systems, tape tends to leave debris on guides, particularly stationary (non-rotating) guides at lateral edges of the tape. Tape tends to leave debris upon magnetic read/write heads also. The prior art has provided some cleaning mechanisms such as abrasive cleaning tape; a dedicated brush for laterally swiping the read/write head; and the inventions disclosed in Poorman U.S. Pat. No. 6,067,212; Underkofler et al. U.S. Pat. No. 6,497,377 B2; and Underkofler et al. U.S. Pat. No. 6,621,656 B2.

SUMMARY

According to at least one embodiment, a tape cartridge is provided with a housing. A reel is mounted for rotation in the housing. Tape with a length, a width and a thickness, is wound upon the reel in a length direction of the tape. A leader is mounted to a free end of the tape. The leader has at least one portion with a width greater than the tape width to clean a tape path.

According to at least one embodiment, a tape cartridge is provided with a housing. A reel is mounted for rotation in the housing. Tape is wound upon the reel. A leader is mounted to a free end of the tape. A brush is mounted to a portion of the leader for cleaning a tape path.

According to at least one embodiment, a data storage device is provided with a tape drive housing with a receptacle adapted to receive a tape cartridge with a housing. A reel is mounted for rotation in the tape cartridge housing. Tape is wound upon the reel. A leader is mounted to a free end of the tape. A brush is mounted to a portion of the leader for cleaning a tape path. A take-up reel is provided. At least one motor drives at least one of the tape cartridge reel and the take-up reel.

According to at least one embodiment, a data storage device is provided with a tape drive housing with a receptacle adapted to receive a tape cartridge. A tape cartridge is provided with a housing. A reel is mounted for rotation in the tape cartridge housing. Tape is wound upon the reel. A leader is mounted to a free end of the tape. A brush is mounted to a portion of the leader for cleaning a tape path. A take-up reel is provided. At least one motor drives at least one of the tape cartridge reel and the take-up reel.

According to at least one embodiment, a method for cleaning a tape drive optical pickup unit lens provides a tape cartridge with a tape leader with a brush on the tape leader. The brush is driven along the tape drive optical pickup unit lens.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
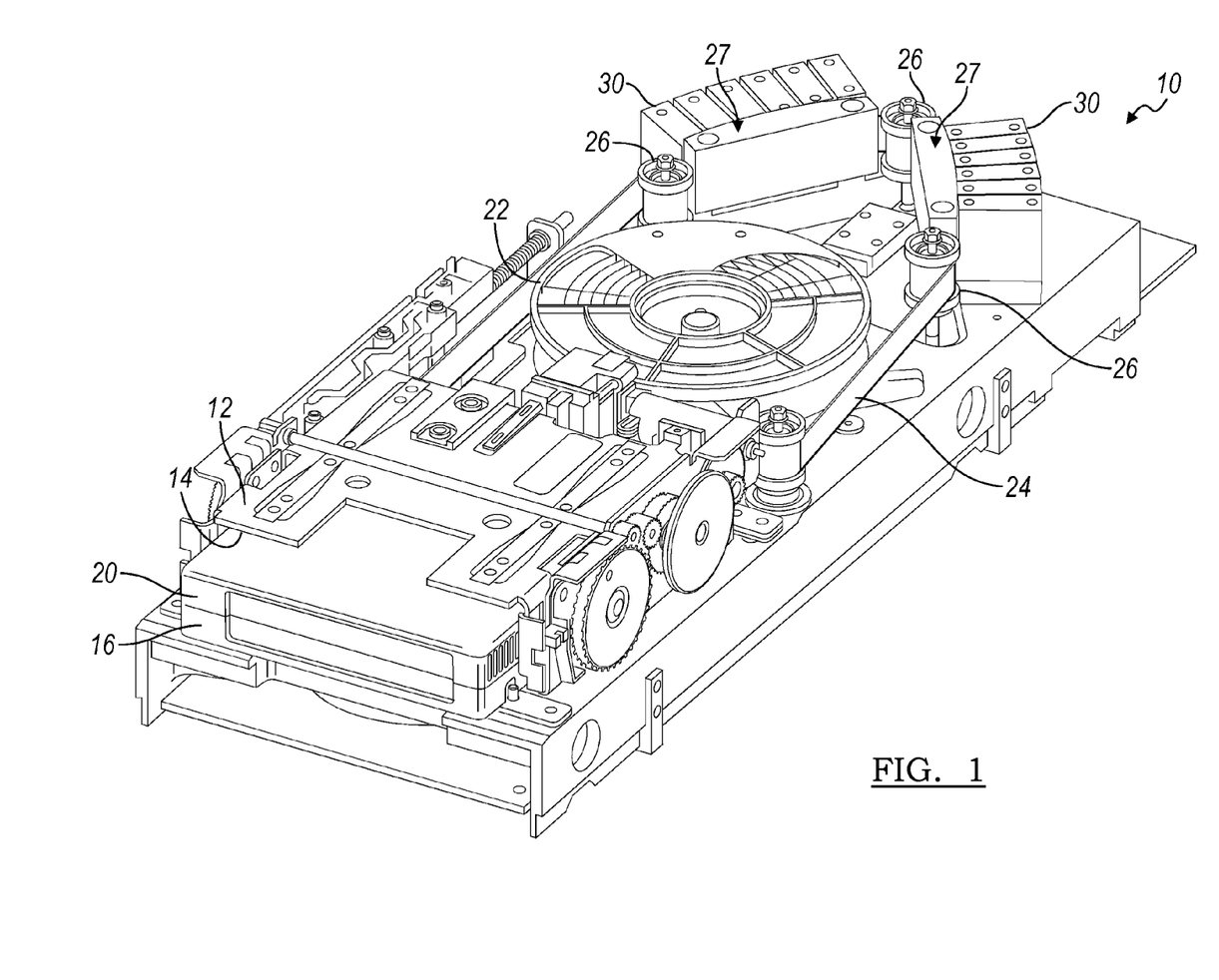
FIG. 1 is a perspective view of a data storage device according to an embodiment.

FIG. 1 illustrates a data storage device according to at least one embodiment and referenced generally by numeral 10. The data storage device 10 in the depicted embodiment is a tape drive system 10. The tape drive system 10 may be an optical tape drive system, or any other type of tape drive system that may benefit from cleaning.

Figures 2, 3:
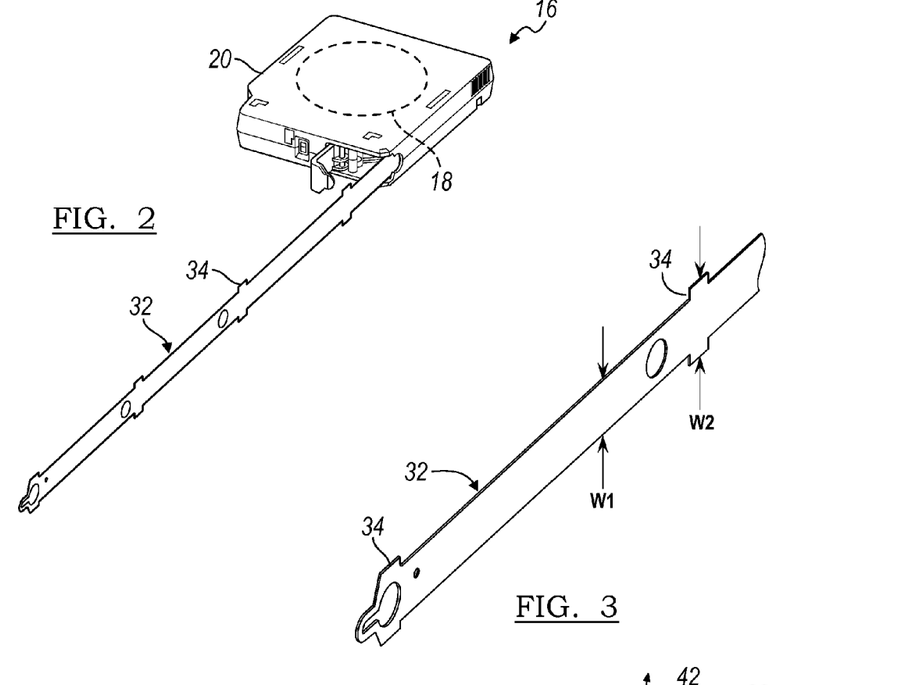
FIG. 2 is a perspective view of a tape cartridge according to an embodiment, illustrated with a leader extending from the tape cartridge.
FIG. 3 is an enlarged perspective view an end of the leader of FIG. 2.

The tape drive system 10 includes a tape drive housing 12 with a receptacle 14 for receiving a tape cartridge 16. One example of the tape cartridge 16 is illustrated in FIG. 2. The tape cartridge 16 may be a single reel cartridge 16 with one tape reel 18 mounted in a cartridge housing 20. Accordingly, the tape drive system 10 includes a take-up reel 22 as is known in the art for cooperating with the tape reel 18 for conveying tape 24 between the tape reel 18 and the take-up reel 22. The tape drive system 10 includes a buckler mechanism, as is known in the art, to connect the tape 24 from the cartridge 16 to the take-up reel 22 once the cartridge 16 is installed into the receptacle 14 of the tape drive housing 12. The tape drive system 10 also includes a pair of servo motors M1, M2 each mechanically connected to one of the reels 18, 22 respectively for driving the reels 18, 22 for conveying the tape 24 between the reels 18, 22. Alternatively, the tape cartridge 16 may be a dual reel tape cartridge, as is also known in the art.

The tape drive system 10 includes a plurality of tape guides 26, 27 for collectively providing a path for the tape 24 between the cartridge reel 18 and the take-up reel 22. The guides 26, 27 cooperate to provide the tape path adjacent to a device to read the tape 24 such as an optical lens 28 (or lenses 28) (FIG. 4) of an optical pickup unit 30 (FIG. 1).

Figure 4:
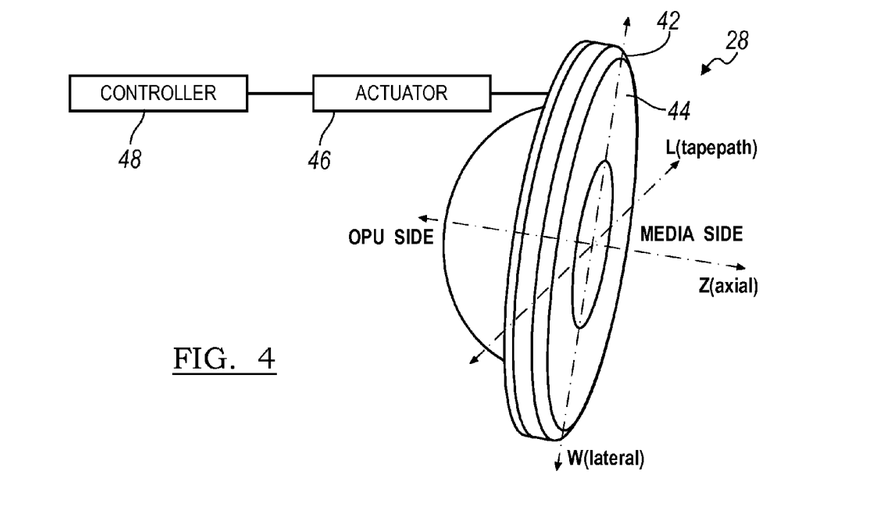
FIG. 4 is an enlarged perspective view of a tape drive optical pickup unit lens of the data storage device of FIG. 1.

Tape 24 tends to leave debris on the guides 26, 27 along lateral edges of the tape 24. In an optical drive system, such as the tape drive system 10, debris, such as dust, may settle upon the lens 28, thereby degrading a laser beam through the lens 28, and consequently degrading a signal. Since the optical pickup unit 30 reads tape 24 without contacting the tape 24, debris that settles upon the lens 28 may remain.

With reference now to FIGS. 2 and 3, a flexible leader 32 is provided on a free end of the tape 24. The leader 32 may be formed integrally with the tape 24, or formed separately. The tape 24 may be data storage tape with a leader 32 for cleaning. Alternatively, the tape 24 may be non-data tape with the leader 32 for use as a dedicated cleaning cartridge 16. As another alternative, the tape cartridge 16 may be a dual reel cartridge, and the leader 32 may be oriented anywhere between the tape reels. The leader 32 may be stamped, cut, or otherwise formed from a flexible plastic sheet that may be coated with a cleaning material.

The tape 24 has a width w1 between the lateral edges. The leader 32 includes a plurality of portions 34 with a greater width w2 than the width w1 of the tape 24. In the depicted embodiment, the leader 32 has a length with a general width w1 corresponding to the tape 24. The cleaning portions 34 are each provided by a pair of tabs or ears each extending the width w2. Of course, the leader 32 could have any variations in width suitable to exceed the width w1 of the tape 24.

The leader 32 may be formed of a thicker material and/or a stiffer material than the tape 24 so that the wider portions 34 are sufficiently sized to engage debris, and resilient enough to remove the debris. The wider portions 34 may be sized to bend under engagement with the guides 26, 27 to further enhance contact with the guides 26, 27. Thus, the leader 32 provides a cleaning operation to the guides 26, 27 as the leader 32 is loaded and unloaded to the take-up reel 22. The bending of the ears 34 of the leader 32 may also cause the leader 32 to extend into contact with the debris on the portions of the guides 26, 27 having debris left by contact with lateral edges of the tape 24. According to at least one alternative embodiment, loading of the leader 32 onto the take-up reel 22, may also clean the take-up reel 22 with the cleaning portions, if required. Of course, the leader 32 may be employed to clean debris from any component at any location upon the path of the tape 24.

Figure 5:
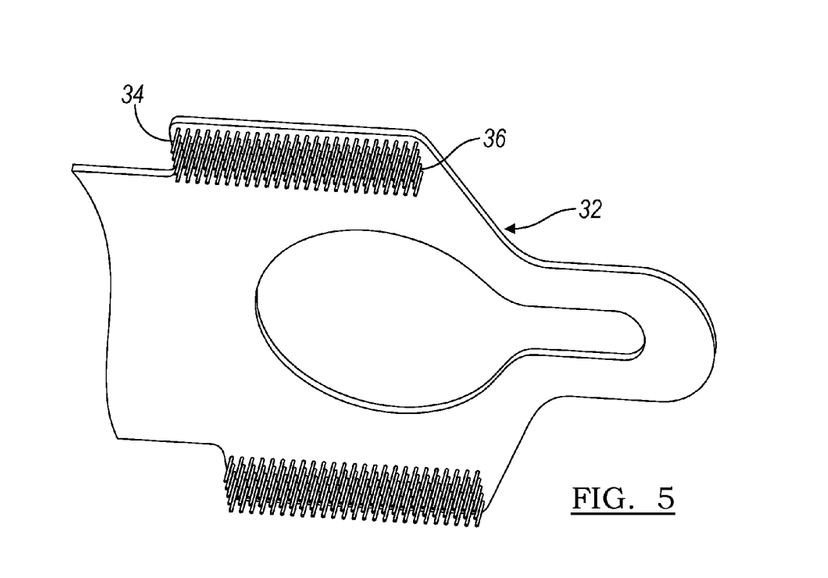
FIG. 5 is an enlarged perspective view of an end of the leader of FIG. 2, according to another embodiment.

According to another embodiment, illustrated in FIG. 5, the leader 32 may be provided with a pair of brushes 36 upon one side 38 of the cleaning portions 34 of the leader 32 for contacting the guides 26. Another section of brush or cleaning material 36 can be provided on the reverse side 40 (FIG. 6) of the leader 32 for contacting the lens 28. The brushes 36 may be formed from a soft material such as felt. The brushes 36 are utilized for brushing debris from the guides 26, 27 and the lens 28.

Referring again to FIG. 4, the lens 28 has a radiused edge 42 on a tape side 44 for providing a smooth transition as the brushes 36 engage the lens tape side 44. The tape 24 travels along the lens 28 in a length L direction of the tape 24, which is also the direction of the tape path. The lens may be connected to a mechanism 46 that is controlled by a controller 48 for adjusting the lens 28 in a lateral or width W direction. The actuator 46 can also adjust the lens 28 in an axial or zoom Z direction.

The controller 48 may be the controller for the tape drive system 10, which may also control motors M1 and M2. The controller 48 may also control the retractable guides 30. A cleaning operation may be sequenced such that the retractable guides 30 are retracted to permit loading of leader 32 through the guides 26 to the take-up reel 22. The motors M1, M2 align the brushes 36 with the lens 28. The lens 28 may be actuated in the zoom direction Z to actuate the brushes 36. Alternatively or additionally, the retractable guides 30 may be extended so that the brushes 36 engage the lens 28. The motors M1, M2 can drive the tape 24 so that the brushes 36 clean the lens 28. Alternatively or additionally, the actuator 46 can actuate the lens 28 laterally to clean the lens 28.

Figure 6:
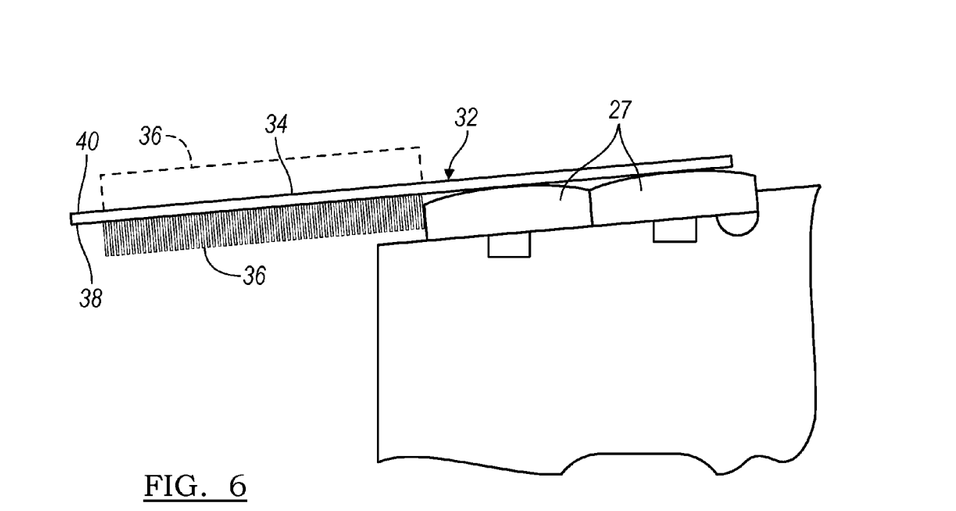
FIG. 6 is a top plan view of a tape guide of the data storage device of FIG. 1, according to an embodiment, illustrated in cooperation with the leader of FIG. 5.

FIG. 6 illustrates the leader 32 approaching a pair of stationary tape guides 27. The brushes 36 have a thickness that is greater than that of the leader 32 to engage the tape guides 27. The guides 27 may be mounted to a plate for retraction and extension relative to the tape path to further a cleaning operation by actuation of the guides 27 relative to the brushes 36.

Figure 7:
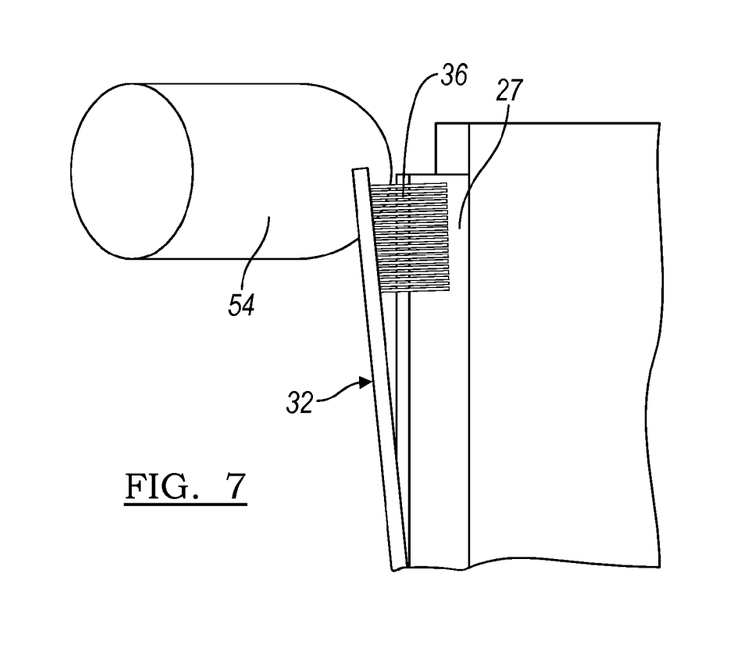
FIG. 7 is a side view, viewed in a direction of tape travel, of a tape guide of the data storage device of FIG. 1, according to an embodiment, illustrated in cooperation with the leader of FIG. 5, in a first position of the leader.
Figure 8:
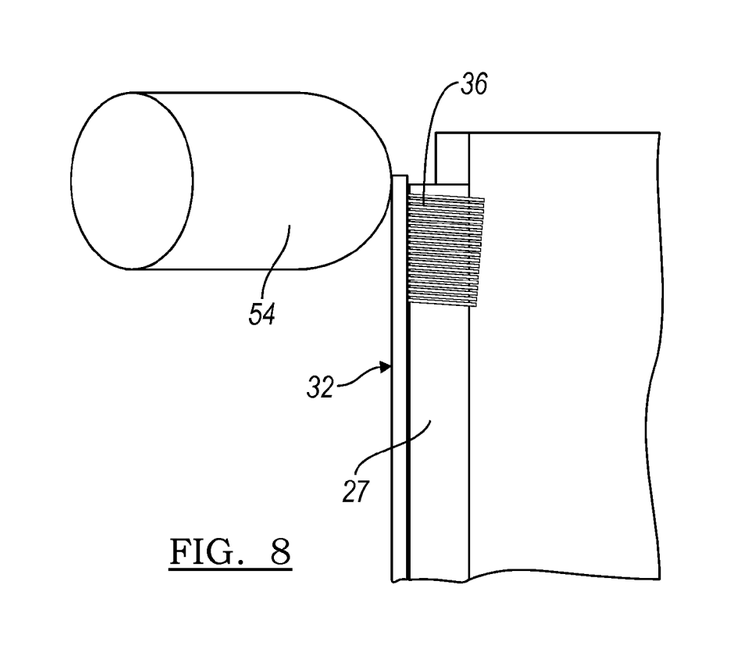
FIG. 8 is another side view of the tape guide of FIG. 7, illustrated in a second position of the leader.

FIGS. 7 and 8 illustrate the brushes 36 of the leader 32 engaging another stationary (or retractable) guide 27. The thickness of the brushes 36 may urge the leader 32 away from the stationary guide 27. In order to ensure a full contact of the brushes 36 with the guide 27, a member 54 is spaced apart from the guide 27 a distance that is less than an unloaded thickness of the leader 32 and the brushes 36. In order to pass the guide 27, the brushes 36 are compressed against the guide 27 thereby ensuring full contact during the cleaning operation.

Referring again to FIG. 1, the take-up reel 22 may include pockets adjacent to a width of a hub upon which the tape 24 is wound to receive the cleaning portions 34 of the leader 32. Alternatively, with a dedicated cleaning cartridge, the brush material 36 may be wrapped upon the hub of the take-up reel 22 without affecting any data tape 24. Another embodiment of a dedicated cleaning cartridge includes a leader 32, wherein the cleaning portions 34 with brush material 36 extend along an entire (or substantial) length of the leader 32.

Figure 9:
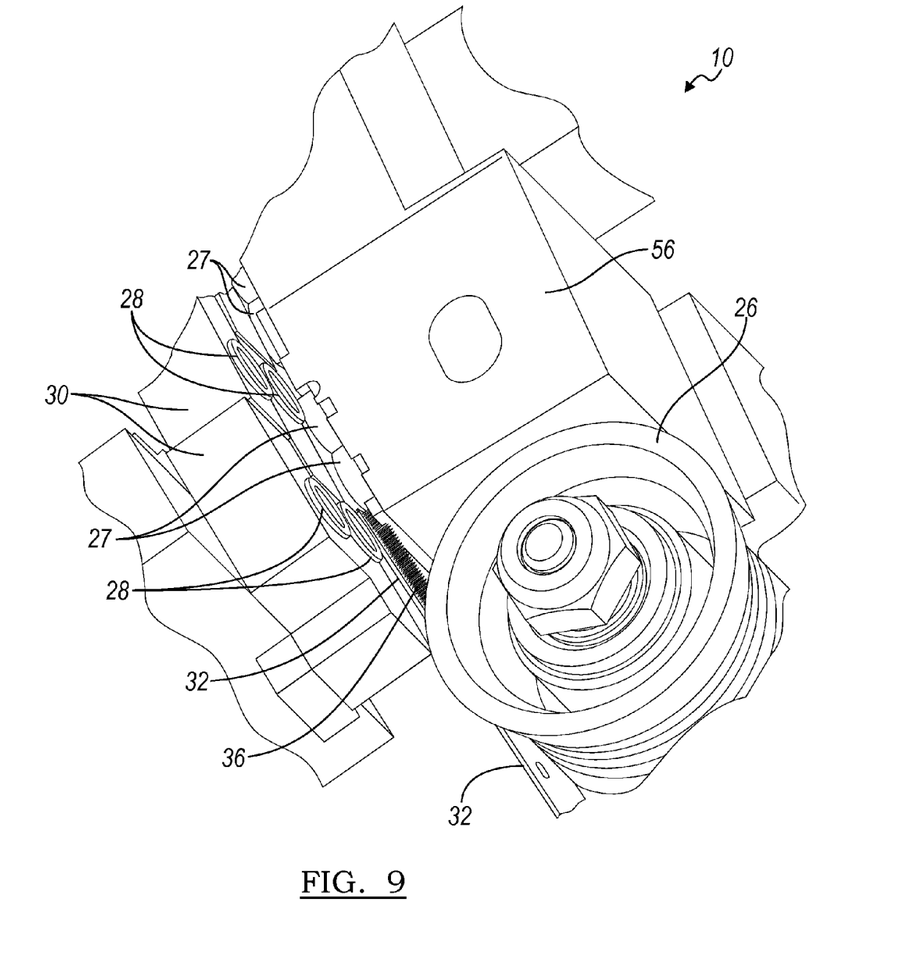
FIG. 9 is a perspective view of a tape guide of the data storage device of FIG. 1, according to another embodiment, illustrated in cooperation with the leader of FIG. 5.
Figure 10:
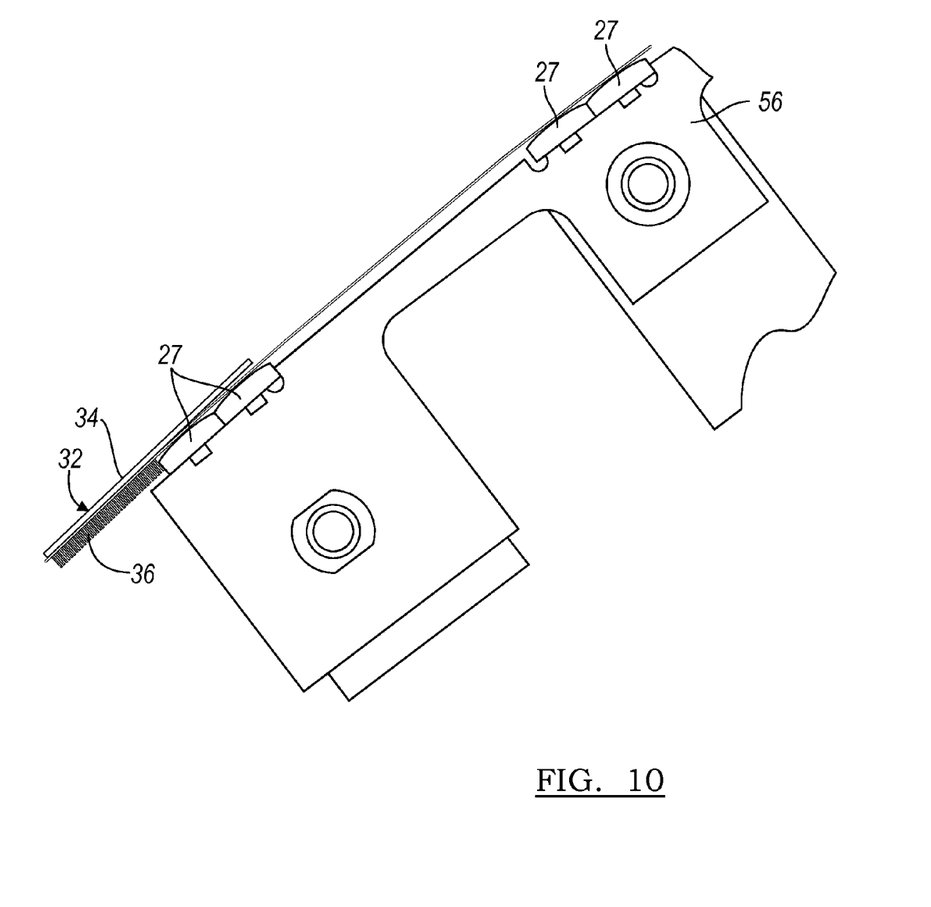
FIG. 10 is a side view, viewed in a direction of tape travel, of the tape guide and data storage device of FIG. 9.

FIGS. 9 and 10 illustrate the tape drive system 10 in greater detail of at least one embodiment. The guides 27 are provided upon a bracket 56, which may be stationary relative to the tape drive housing 12, or may be retractable as discussed above. For the embodiment depicted in FIG. 9, the optical pickup unit 30 includes four optical lenses 28 spaced apart from the guides 27. The tape 24 follows a tape path defined by the guides 27 for conveying the tape 24 adjacent to the lenses 28. The optical pickup unit 30 may also actuate the lenses 28 as also discussed above.

As the leader 32 is translated along the guides 27, the brush material engages and cleans the guides 27. Additional brush material 36 may optionally be provided on the leader 32 facing the lenses for cleaning the lenses 28 as well. Any combination of guides 27 and lenses 28 is contemplated within various embodiments. Any combination of cleaning operations, by brush 36 travel, guide 27 retraction and lens 28 actuation is also contemplated within various embodiments.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A data storage device comprising:
   a tape drive housing with a receptacle adapted to receive a tape cartridge comprising a housing, a reel mounted for rotation in the housing, tape wound upon the reel, a leader mounted to a free end of the tape, and a brush mounted to a portion of the leader to clean a tape path, wherein the brush and the leader collectively have an unloaded thickness;
   a take up reel;
   at least one motor to drive at least one of the tape cartridge reel and the take-up reel;
   a guide; and a member spaced apart from the guide a distance that is less than the unloaded thickness of the brush and the leader in order to compress the brush as the brush travels across the guide.

2. The data storage device of claim 1 further comprising the tape cartridge.

3. The data storage device of claim 2 wherein the tape has length, a width and a thickness, the tape wound upon the reel in a length direction of the tape; and wherein the leader has at least one portion with a width greater than the tape width to clean a tape path.

4. The data storage device of claim 3 wherein the leader has a thickness greater than that of the tape.

5. The data storage device of claim 3 further comprising a brush mounted to at least one portion of the leader.

6. The data storage device of claim 5 wherein the brush is mounted to the at least one portion of the leader that has the width greater than the width of the tape.

7. The data storage device of claim 5 wherein the brush is mounted to one side of the leader; and wherein the tape cartridge further comprises a second brush mounted to another side of the leader.

8. The data storage device of claim 1 further comprising a lens aligned with the tape path to read data from the tape.

9. The data storage device of claim 8 wherein the lens has a radiused edge adjacent a side of the lens facing the tape path.

10. The data storage device of claim 8 wherein the lens is mounted to the drive housing for limited translation relative to the drive housing.

11. The data storage device of claim 10 wherein the lens is mounted to the drive housing for limited translation in a lateral direction relative to the tape path.

12. The data storage device of claim 11 wherein the lens is mounted to the drive housing for limited translation in a thickness direction of the tape.

13. The data storage device of claim 10 further comprising:
a lens actuator operably connected to the lens and the drive housing to adjust the lens relative to the housing; and
a controller in communication with the lens actuator.

14. The data storage device of claim 13 wherein the controller is configured to instruct the lens actuator to translate the lens when the brush is aligned with the lens.

15. The data storage device of claim 14 wherein the controller is in communication with the at least one motor; and
wherein the controller is configured to align the brush with the lens before instructing the lens actuator to translate the lens.

16. A data storage device comprising:
a tape drive housing with a receptacle adapted to receive a tape cartridge comprising a housing, a reel mounted for rotation in the housing, tape wound upon the reel, a leader mounted to a free end of the tape, and a brush mounted to a portion of the leader to clean a tape path;
a take-up reel;
at least one motor to drive at least one of the tape cartridge reel and the take-up reel; and
a lens aligned with the tape path to read data from the tape, wherein the lens has a radiused edge adjacent a side of the lens facing the tape path.

17. A data storage device comprising:
a tape drive housing with a receptacle adapted to receive a tape cartridge comprising a housing, a reel mounted for rotation in the housing, tape wound upon the reel, a leader mounted to a free end of the tape, and a brush mounted to a portion of the leader to clean a tape path;
a take-up reel;
at least one motor to drive at least one of the tape cartridge reel and the take-up reel;
a lens aligned with the tape path to read data from the tape, wherein the lens is mounted to the drive housing for limited translation relative to the drive housing;
a lens actuator operably connected to the lens and the drive housing to adjust the lens relative to the housing; and
a controller in communication with the lens actuator, wherein the controller is configured to instruct the lens actuator to translate the lens when the brush is aligned with the lens.

18. The data storage device of claim 17 wherein the controller is in communication with the at least one motor; and
wherein the controller is configured to align the brush with the lens before instructing the lens actuator to translate the lens.

* * * * *

UNITED STATES PATENT AND TRADEMARK OFFICE
CERTIFICATE OF CORRECTION

PATENT NO. : 8,630,065 B1  
APPLICATION NO. : 13/536224  
DATED : January 14, 2014  
INVENTOR(S) : Underkofler et al.

Page 1 of 1

It is certified that error appears in the above-identified patent and that said Letters Patent is hereby corrected as shown below:

On title page, column 1, item [75] under Inventors, line 2, delete "Broomfiled," and insert -- Broomfield, --, therefor.

On title page, column 1, item [75] under Inventors, line 3, delete "Thronton," and insert -- Thornton, --, therefor.

In the Claims

In column 4, line 64, in Claim 1, delete "take up" and insert -- take-up --, therefor.

Signed and Sealed this
Eighth Day of July, 2014

Michelle K. Lee
*Deputy Director of the United States Patent and Trademark Office*